United States Patent Office 3,179,423
Patented Apr. 20, 1965

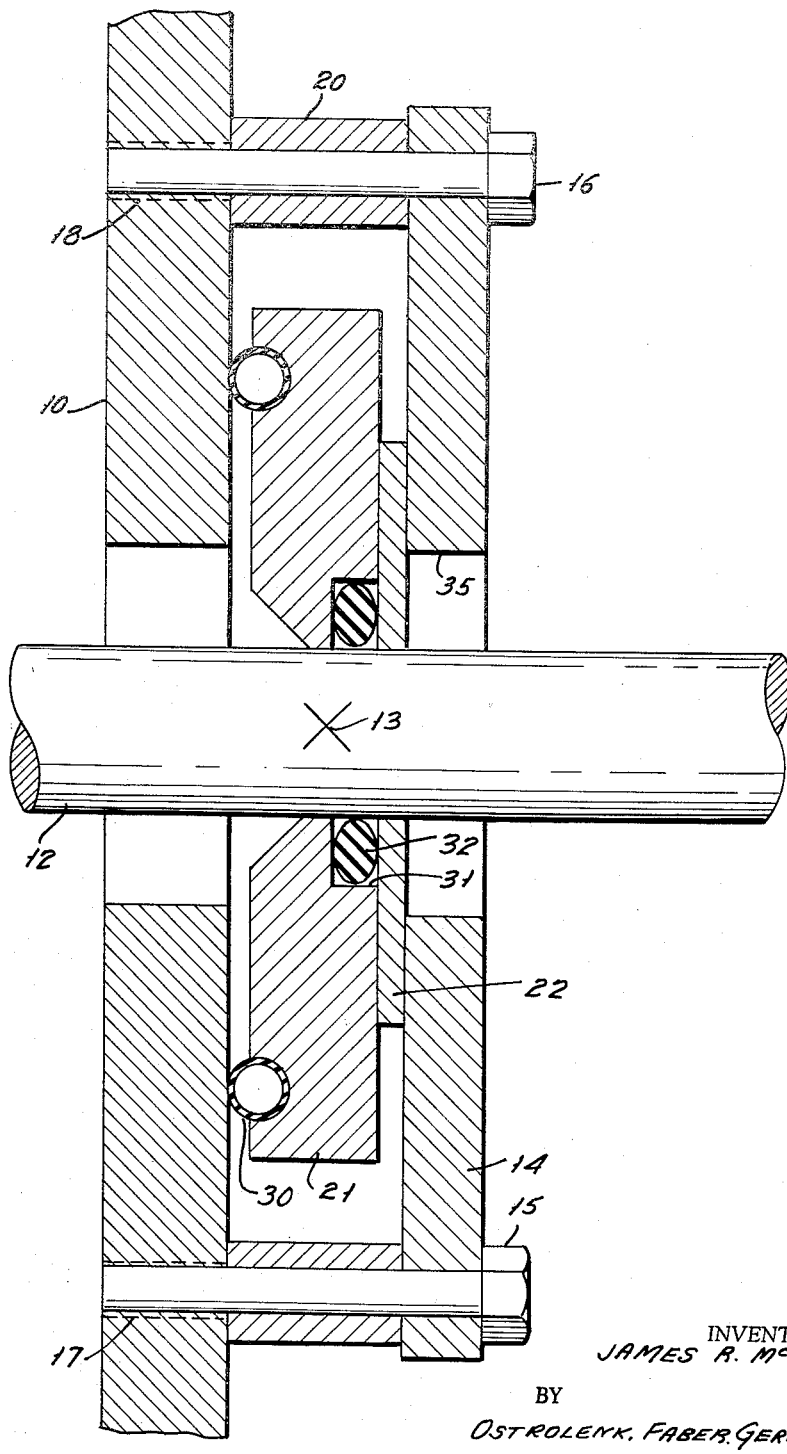

3,179,423
GAS SEAL FOR OIL CIRCUIT BREAKERS
James R. McCloud, Burbank, Calif., assignor to I-T-E
Circuit Breaker Company, Philadelphia, Pa., a corporation of Pennsylvania
Filed Oct. 26, 1962, Ser. No. 233,326
3 Claims. (Cl. 277—30)

My invention relates to a novel gas seal for oil circuit breakers, and is an improvement over the gas seal shown in my copending application Serial No. 67,125, filed November 3, 1960, entitled "Three-Phase Oil Circuit Breaker" and assigned to the assignee of the present invention.

Many applications exist which require that a movable rod extend through a wall which encloses a source of high pressure gas or encloses a material which can, under predetermined conditions, generate a considerable pressure. Thus, a sealing means must be provided for the rod to prevent the venting of the pressure through the opening through which the rod passes.

Applications of this type exist, for example, in the oil circuit breaker field wherein a link or rod from an external operating mechanism must pass into the oil-containing tank of the circuit breaker. During interrupting conditions, considerable pressures are generated within the oil-containing tank. It is necessary that the operating mechanism link passing through the wall of the tank, and which necessarily must be free to perform several types of motion, does not serve as a vent through which these gases may move.

Gas seals of this type have been provided in the past, and are typically shown in my above noted copending application wherein a plurality of interleaved plates, some of which are carried by the rod and others of which are carried by housing portions stationary with respect to the rod, are spring biased together to serve as the seal, although they are movable with respect to one another to permit the required rod motion.

The novel structure of the present invention eliminates the need for such spring biasing members, and serves as an effective seal which requires fewer parts and less critical spacing than do the gas seals of the prior art.

Accordingly, a principal object of this invention is to provide a novel, inexpensive gas seal for rods which extend through a high pressure enclosing wall and are necessarily movable with respect to the wall.

Another object of this invention is to provide a highly effective gas seal which has a minimum of parts.

A further object of this invention is to provide a novel gas seal which is extremely rugged, and is simple in manufacture.

These and other objects of this invention will become more apparent from the drawing which shows a cross-sectional view of a gas seal constructed in accordance with the invention.

Referring to the drawing, I have illustrated therein a wall 10 which has an opening 11 therein which receives a rod 12. The rod 12 can, for example, be connected to a movable means on the left-hand side of wall 10, and to operating means on the right-hand side of wall 10, whereby the rod must execute motion along its axis as well as a lateral motion or a skewing which could, for example, take place around a general center of motion schematically indicated by the cross 13.

The application of such a gas seal could, for example, be as the gas seal in the wall of an oil circuit breaker, as illustrated in my above noted copending application Serial No. 67,125 which is incorporated herein as a part of the present application.

In accordance with the invention, a mounting platform 14 is bolted to wall 10 by a plurality of bolts such as bolts 15 and 16 which extend through openings in platform 14 and into tapped openings 17 and 18 respectively in wall 10. Conversely, bolts 15 and 16 could extend through openings in wall 10 and be captured by bolts on the outside or left-hand side of tank wall 10. Platform 14 is accurately spaced from wall 10 by spacers 19 and 20 which surround bolts 15 and 16. A disk 21 and a disk 22 are then captured between platform 14 and wall 10 wherein disk 22 has a relatively tight fit about rod 12, although the rod 12 can relatively easily move axially with respect to disk 22.

The disk is then provided with an annular groove which receives O-ring 30 and also has an inner shoulder 31 which receives a second O-ring 32. The inner surface of wall 10 at the area at which it engages O-ring 30 is preferably chrome-plated so that it will have a smooth surface.

In a similar manner, the external surface of rod 12 which engages O-ring 32 will preferably have a smooth surface as by careful machining or by chrome-plating.

Platform 14 has an enlarged window 35 to pass rod 12 which is similar to enlarged window 11 in wall 10. The windows 11 and 35 are dimensioned to accommodate at least the maximum lateral or angular displacement of rod 12.

The O-ring 30 which may have a diameter of the order of $3/16$ of an inch is then normally held in compression which is of the order of 0.010 inch by appropriate control of the length of spacers 19 and 20.

High pressure fluid such as gas or vapor which is generated in the area to the right of wall 10 and which attempts to pass through window 11 by flowing around the outer periphery of platform 14 will be blocked by O-ring 30. As the rod 12 moves up and down, the O-ring 30 moves over the smooth chrome-plated inner surface of wall 10 to maintain the seal.

The disk 22 similarly maintains O-ring 32 in compression so that it radially expands into engagement with the periphery of shaft 12, whereby O-ring 32 blocks the escape of gas attempting to move over the rod and through window 35. Since the rod 12 can slide with respect to O-ring 32 when the rod 12 is axially displaced, this seal is also maintained.

Accordingly, a highly effective gas seal which seals off window 11 in a highly efficient manner is provided by the two O-rings 30 and 32 which are held under appropriate compression by the novel compressing structure.

Although I have described preferred embodiments of my novel invention, many variations and modifications will now be obvious to those skilled in the art, and I prefer, therefore, to be limited not by the specific disclosure herein, but only by the appended claims.

I claim:
1. In combination; a wall having an opening therein, a shaft extending through said opening and being laterally movable within said opening, and a seal for sealing said opening; said seal including a first disk, a second disk, a platform, and a first and second sealing means; said platform being rigidly secured in spaced relation to said wall and having an opening therein for receiving said movable rod; said first and second disks being positioned between said wall and said platform; said first and second disks having openings therein for receiving said operating rod; said first disk being adjacent said wall; a radial surface of said first disk adjacent said wall having said first sealing means therein; said first sealing means extending around said opening in said wall and extending from said radial surface of said first disk to the surface of said wall adjacent thereto; the opposite radial surface of said first disk having an annular groove therein; said annular groove receiving said second sealing means; said second sealing means contacting the periphery of said shaft and extending from said groove to said shaft; said second sealing means further extending from said shaft and into annular engagement with a radial surface of said second disk adjacent said first disk; said opening in said second disk having the same cross-section as said shaft whereby said second disk is laterally movable with said shaft; the opposite radial surface of said second disk being slidably received by the surface of said platform adjacent thereto; said second disk being forced toward said first disk by said platform to place said first and second sealing means under pressure; the surface of said wall contacting said first sealing means being smooth to permit said first sealing means to slide with respect thereto; the surface of said shaft contacting said second sealing means being smooth to permit said second sealing means to slide thereon.

2. The combination substantially as set forth in claim 1 wherein said first and second sealing means are O-rings.

3. The combination substantially as set forth in claim 1 wherein the center of motion of said shaft is adjacent said first disk.

References Cited by the Examiner
UNITED STATES PATENTS

| | | | |
|---|---|---|---|
| 2,985,473 | 5/61 | Parker | 277—95 XR |
| 3,094,335 | 6/63 | Shenk | 277—5 |

EDWARD V. BENHAM, *Primary Examiner.*

SAMUEL ROTHBERG, *Examiner.*